A. F. HALL.
Corn-Planters.
No. 197,549. Patented Nov. 27, 1877.
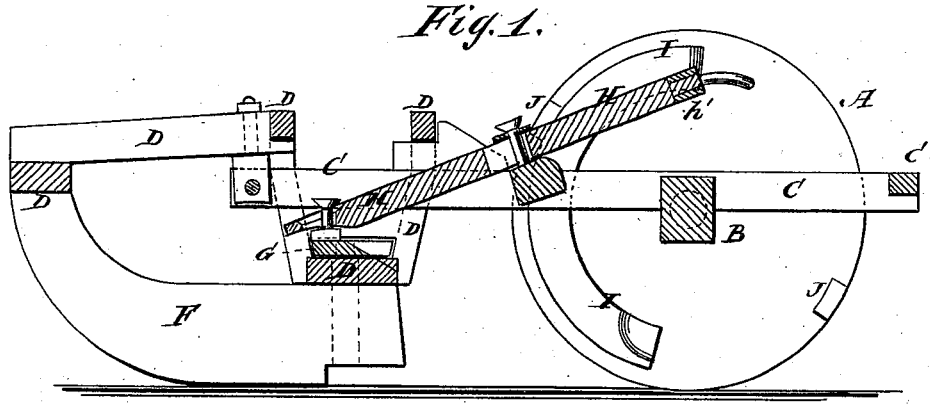
Fig. 1.
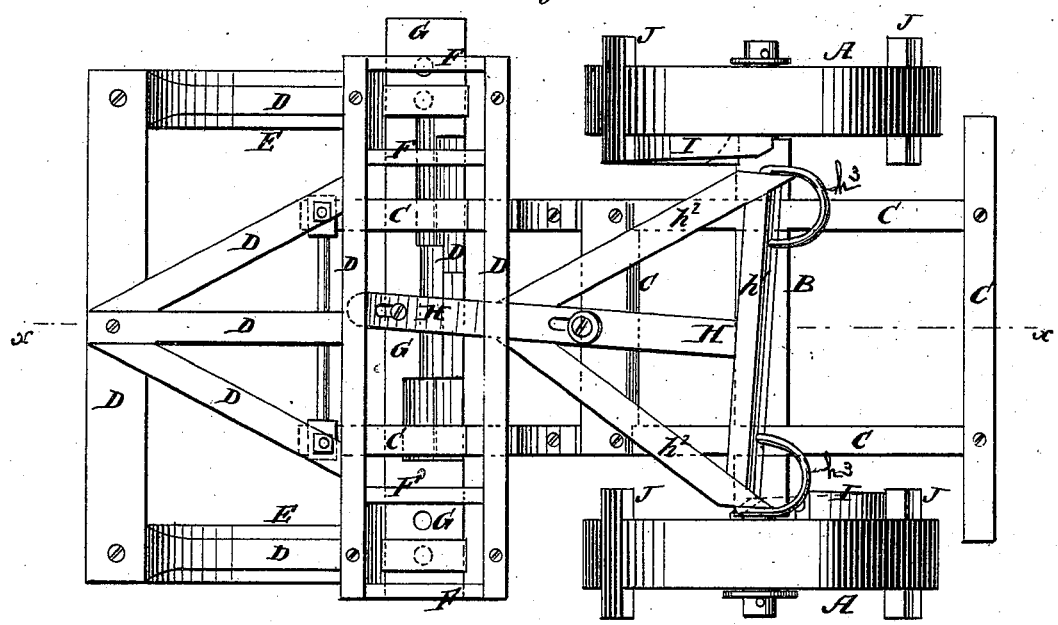
Fig. 2.
Fig. 3.
WITNESSES:
E. Wolff
J. H. Scarborough
INVENTOR:
A. F. Hall.
BY
ATTORNEYS.

UNITED STATES PATENT OFFICE.

ALLEN F. HALL, OF ONARGA, ILLINOIS.

IMPROVEMENT IN CORN-PLANTERS.

Specification forming part of Letters Patent No. 197,549, dated November 27, 1877; application filed May 21, 1877.

*To all whom it may concern:*

Be it known that I, ALLEN FARGO HALL, of Onarga, in the county of Iroquois and State of Illinois, have invented a new and useful Improvement in Corn-Planters, of which the following is a specification:

Figure 1 is a vertical longitudinal section of a corn-planter to which my improvement has been applied, taken through the line $x\,x$, Fig. 2. Fig. 2 is a top view of the same. Fig. 3 is a detail view of a modification of the lever.

Similar letters of reference indicate corresponding parts.

The object of this invention is to furnish an improved attachment for corn-planters, which shall be so constructed as to drop the corn automatically, at uniform distances apart, and to mark the hills, so that the field may be planted in accurate check-row.

The invention will first be described in connection with the drawings, and then pointed out in the claim.

A A are the wheels, which revolve upon the journals of the axle B. To the axle B is attached the frame C, with the forward end of which is connected the frame-work D, that connects the runners E and the seed-hoppers F, attached to their rear ends. G is the dropping-slide, which works upon the bar of the frame D, that connects the rear ends of the runners E and the hoppers F. To the center of the dropping-slide G is pivoted the forward end of the lever H, which is pivoted to the middle cross-bar of the frame C. Short longitudinal slots are formed in the lever H to receive the pivoting-bolts, to give the said lever the necessary play. The rear end of the lever H has a cross-head, $h^1$, attached to it, which is strengthened by the inclined braces $h^2$, attached to it and to the body of the said lever. To the ends of the cross-head of the lever H are attached curved or beveled shoes $h^3$, against which strike the inclined forward ends of the semi-ring cams I, attached to the inner sides of the wheels A, in such positions as to strike the opposite ends of the cross-head of the lever H alternately, and thus vibrate the said lever to operate the dropping slide G and drop the seed. The cams I are made of such a length as to hold the lever in the position into which it has been moved until the cam of the other wheel has come into position to move it in the other direction, and drop the seed for another hill. Should the second wheel, from any cause, get around before the lever has been released from the first wheel, the lever H will act as a stop to prevent its turning, and will cause it to slide until the said lever H has been released from the cam of the first wheel, so that the hills will always be dropped at uniform distances apart.

In the case of wet soil, when mud gathers upon the wheels, the cams I may be lengthened by detachable blocks attached to the wheels, to give the machine full control over the distance between the hills.

To the rim of each of the wheels A are attached two blocks, J, in such positions, with respect to the semi-ring cams I, as to mark the hills, and thus enable the field to be planted in accurate check-row. This seed-dropping device may be applied to any of the ordinary corn-planters.

In case the planter may be short-geared, the forward end of the lever H, instead of being pivoted directly to the dropping-slide G, may be pivoted to the auxiliary lever K, the forward end of which is pivoted to the cross-bar of the frame D, that connects the forward ends of the runners E, and its rear end is pivoted to the dropping-slide G, so that the dropping-slide will still be operated by the vibrations of the lever H.

Having thus described my invention, I claim as new and desire to secure by Letters Patent—

In a corn-planter, the wheels A, provided with the semicircular distance-measuring cams I, combined with and constructed to hold the dropping-slide levers H, and insure a uniform distance between the hills, as set forth.

ALLEN FARGO HALL.

Witnesses:
MILTON DOOLITTLE,
H. M. BOSWELL.